United States Patent [19]
Goralski

[11] 3,919,213
[45] Nov. 11, 1975

[54] PROCESS FOR BROMINATING A SULFO ACETAMIDE

[75] Inventor: Christian T. Goralski, Midland, Mich.

[73] Assignee: The Dow Chemical Company, Midland, Mich.

[22] Filed: Sept. 3, 1974

[21] Appl. No.: 502,708

Related U.S. Application Data

[62] Division of Ser. No. 330,612, Feb. 8, 1973, Pat. No. 3,862,935.

[52] U.S. Cl. 260/246 B; 260/247.1 R; 260/247.1 M; 260/293.63; 260/293.71; 260/293.85; 260/326.42; 260/326.5 SF; 260/556 A; 260/999

[51] Int. Cl.$^2$ .................................. C07D 295/18

[58] Field of Search ....... 260/293.63, 246 B, 556 A, 260/326.5 SF, 326.42, 293.85, 247.1 R, 247.1 M, 293.71

[56] References Cited
FOREIGN PATENTS OR APPLICATIONS
1,472,310  3/1967  France

*Primary Examiner*—Richard J. Gallagher
*Assistant Examiner*—Jose Tovar
*Attorney, Agent, or Firm*—Theodore Post; C. Kenneth Bjork

[57] ABSTRACT

Brominated sulfoacetic acid amides of the formula $$R_1R_2NCOCBr_xH_{2-x}SO_2NR_1R_2$$

in which $R_1$ and $R_2$ are independently selected from hydrogen and lower alkyl or, in conjunction with the nitrogen atom, form a heterocycle which may contain an oxygen hetero atom and x is an integer from 1 to 2. The compounds are prepared by brominating amides of sulfoacetic acid. The compounds have antimicrobial activity.

1 Claim, No Drawings

PROCESS FOR BROMINATING A SULFO ACETAMIDE

SUMMARY OF THE INVENTION

This is a division, of application Ser. No. 330,612 filed Feb. 8, 1973 now U.S. Pat. No. 3,862,935 issued 1/28/75.

This invention concerns brominated sulfoacetic acid amides represented by the formula $$R_1R_2NCOCBr_xH_{2-x}SO_2NR_1R_2$$

wherein $R_1$ and $R_2$ are independently selected from hydrogen and lower alkyl or, in conjunction with the nitrogen atom, form a heterocycle which may also contain an oxygen hetero atom and may be substituted with 1 to 2 lower alkyl groups, such as, for example, a pyrrolidino, piperidino, morpholino, 4-methylpiperidino or 2,6-dimethylmorpholino group and x represents an integer from 1 to 2. In the specification and claims, "lower alkyl" designates a 1 to 4 carbon atom straight or branched-chain alkyl group, i.e., from 1, to 2, to 3, to 4 carbon atoms, such as, for example, methyl, ethyl, propyl, isopropyl, butyl, isobutyl or secondary butyl.

The compounds are prepared by brominating amides of sulfoacetic acid in aqueous medium with bromine in the presence of hydrobromic acid. When monobrominated amide is desired, substantially equimolar proportions of sulfoacetic acid amide and bromine are used, and when the dibrominated amides are desired, a substantial excess of more than 2 molar proportions up to about 5 molar proportions of bromine per molar proportion of sulfoacetic acid amide is used. The reaction is advantageously carried out at room temperature. The compounds have antimicrobial activity.

DESCRIPTION OF SOME PREFERRED EMBODIMENTS

The following examples describe representative specific embodiments and the best mode contemplated by the inventor of carrying out the invention. The compounds are identified by elemental analysis and/or nuclear magnetic resonance spectroscopy.

EXAMPLE 1

1-(Bromo(piperidinosulfonyl)acetyl)piperidine

In a 250 ml. single-neck flask equipped with a magnetic stirrer place 1.37 g. (0.005 mol) of 1-(piperidinosulfonyl)acetyl)piperidine, 150 ml. of water, 2.0 ml. of 48% hydrobromic acid and 0.80 g. (0.005 mol) of bromine. The mixture is not homogenous; a portion of both the amide and the bromine are not in solution. The flask is stoppered and the mixture is allowed to stir at room temperature. After a period of 8 days, the bromine color disappears and a white precipitate forms. The precipitate is filtered off, air-dried and recrystallized from approximately 20 ml. of absolute ethanol to give 0.70 g. of 1-(bromo(piperidinosulfonyl)acetyl)piperidine, m.p. 116–118C.

Anal. Calcd. for $C_{12}H_{21}BrN_2O_3S$: C, 40.79; H, 5.99; Br, 22.62; N, 7.93; S, 9.07. Found: C, 40.39; H, 5.90; Br, 23.40; N, 7.56; S, 8.81.

EXAMPLE 2

4-(Bromo(morpholinosulfonyl)acetyl)morpholine

In a 500 ml. flask equipped with a magnetic stirrer place 5.56 g. (0.02 mol) of 4-(morpholinosulfonyl)acetyl)morpholine, 300 ml. of water, 2.5 ml. of 48% hydrobromic acid and 3.20 g. (0.02 mol) of bromine. The flask is stoppered and the mixture is allowed to stir at room temperature. After 9 days, the bromine color disappears and a fluffy, white precipitate forms. The solid is filtered, washed with water, air-dried, and recrystallized from approximately 75 ml. of absolute ethanol to give 3.98 g. of 4-(bromo(morpholinosulfonyl)acetyl)morpholine, m.p. 184–185C.

Anal. Calcd. for $C_{10}H_{17}BrN_2O_5S$: C, 33.63; H, 4.80; Br, 22.37; N, 7.84; S, 8.98. Found: C, 34.03; H, 4.85; Br, 22.40; N, 7.94; S, 8.97.

EXAMPLE 3

2,2-Dibromo-2-(sulfamoyl)acetamide

In a 500 ml. three-neck flask equipped with a magnetic stirrer and an addition funnel place 5.0 g. (0.036 mol) of sulfamoylacetamide, 360 ml. of water, and 18 ml. of 48% hydrobromic acid. To this solution, 17.39 g. (0.108 mol) of bromine is added dropwise with stirring. After the addition is complete, the reaction mixture is allowed to stir at room temperature for 70 hours. The water is removed in vacuo from the aqueous layer, leaving a thick, tan liquid. A small amount of ethanol is added to the liquid, and the resulting solution is cooled in an ice bath. A white solid separates which is filtered, air-dried, and recrystallized from ether/hexane to give 0.62 g. of 2,2-dibromo-2-(sulfamoyl)acetamide as white microcrystals, m.p. 232–234C.

Anal. Calcd. for $C_2H_4Br_2N_2O_3S$: C, 8.12; H, 1.36; Br, 54.00; N, 9.47; S, 10.83. Found: C, 8.57; H, 1.67; Br, 53.70; N, 9.55; S, 10.84.

EXAMPLE 4

2-Bromo-2-(dimethylsulfamoyl)-N,N-dimethylacetamide

The procedure of Example 3 is repeated, substituting 2-(dimethylsulfamoyl)-N,N-dimethylacetamide in place of sulfamoylacetamide and reducing the amount of bromine to 0.036 mol. The yellow crystalline product obtained melts at 58–61C.

The compounds of the invention are employed as antimicrobials for the control of bacteria, fungi and yeasts. For such uses, the compounds can be employed in an unmodified form or dispersed on a finely divided solid and employed as dusts. Such mixtures can also be dispersed in water with or without the aid of a surface-active agent and the resulting aqueous suspensions employed as sprays. In other procedures, the products can be employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions. Good results are obtained when employing compositions containing antimicrobial concentrations and usually from about 100 to 10,000 parts by weight of one or more of the compounds per million parts of such composition.

In representative operations, compounds of the present invention were tested for their activity as antimicrobials using conventional agar dilution tests. The following Table presents results, expressed as concentration of toxicant in parts per million to achieve 100% growth inhibition (kills) of the indicated organisms.

Minimum Growth Inhibitory Concentration, ppm

| Compound of Example | Sa | Ca | St | Mp | Tm | Bs | Cp | Aa | Pp | Cf | Ci | Ts | At | Rn |
|---|---|---|---|---|---|---|---|---|---|---|---|---|---|---|
|  | 500 | 500 | 500 | 100 | 100 | 100 | 500 | — | 500 | 100 | 500 | 500 | 100 | — |
| 5Q0 | 500 | 500 | — | 500 | 500 | 100 | 500 | 500 | 500 | 500 | — |  | 500 | 100 |
| 3 | 100 | 100 | 100 | 100 | 100 | 100 | 100 | 100 | 100 | 100 | 100 | 100 | 100 | 500 |
| 4 | 100 | 100* | 100 | 100 | 10 | 100 | 2 | 100 | 10 | 100 | 2 | 2 | 2 | 2 |

Sa = S. aureus
Ca = C. albicans
St = S. typhosa
Mp = M. phlei
Tm = T. mentagrophytes
Bs = B. subtilis
Cp = C. pelliculosa
Aa = A. aerogenes
Pp = P. pullulans
Cf = C. fragans
Ci = C. ips
Ts = Trichoderm Sp. Madison P-42
At = A. terreus
Rn = R. nigricans

* = 50% growth inhibition
— = no control at 500 ppm
2 = no control at 100 ppm

The sulfoacetic acid amide starting materials are prepared by the method of Hoogenboom e.a., J. Org. Chem. 34, 3414 (1969).

What is claimed is:

1. A method for preparing a brominated amide of sulfoacetic acid corresponding to the formula $$R_1R_2NCOCBr_xH_{2-x}SO_2NR_1R_2$$

wherein $R_1$ and $R_2$ are independently selected from hydrogen and lower alkyl or, in conjunction with the nitrogen atom, form pyrrolidino, piperidino, morpholino, 4-methyl piperidino or 2,6-dimethyl morpholino, and x is an integer from 1 to 2, which comprises the step of brominating an amide of sulfoacetic acid corresponding to the formula $$R_1R_2NCOCH_2SO_2NR_1R_2$$

wherein $R_1$ and $R_2$ have the meaning previously given by mixing in the presence of aqueous hydrobromic acid as reaction medium substantially equimolar proportions of bromine and a said sulfoacetic acid amide corresponding to the last formula to obtain a monobrominated sulfoacetic acid amide, and mixing in excess of 2 molar proportions up to about 5 molar proportions of bromine per molar proportion of the indicated sulfoacetic acid amide to obtain a dibrominated sulfoacetic acid amide and recovering the said brominated sulfoacetic acid amide.

* * * * *

UNITED STATES PATENT AND TRADEMARK OFFICE
CERTIFICATE OF CORRECTION

PATENT NO. : 3,919,213
DATED : November 11, 1975
INVENTOR(S) : Christian T. Goralski It is certified that error appears in the above-identified patent and that said Letters Patent are hereby corrected as shown below:

Column 1, line 54, "(piperidinosulfonyl)" should read --((piperidinosulfonyl)--;

Column 1, line 65, "116-118C" should read --116-118°C";

Column 2, line 5, "4-(morpholinosulfonyl-" should read --4-((morpholinosulfonyl- --;

Column 2, line 15, "184-185C" should read --184-185°C--;

Column 2, line 35, "232-234C" should read --232-234°C--;

Column 2, line 48, "58-61C" should read --58-61°C--;

Columns 3 and 4, in the Table, under the first heading titled "Compound of Example", the first blank should read --1--;

Columns 3 and 4, in the Table, under the first heading titled "Compound of Example", "500" should read --2--;

Columns 3 and 4, in the Table, under the heading titled "Cp", line 4, "2" should read -- -2 --;

Columns 3 and 4, in the Table, under the heading titled "Ci", line 4, "2" should read -- -2 --;'

Columns 3 and 4, in the Table, under the heading titled "Ts", line 2, the blank should read --500--;

Columns 3 and 4, in the Table, under the heading titled "Ts", line 4, "2" should read -- -2 --;

UNITED STATES PATENT AND TRADEMARK OFFICE
CERTIFICATE OF CORRECTION

PATENT NO. : 3,919,213
DATED : November 11, 1975
INVENTOR(S) : Christian T. Goralski It is certified that error appears in the above-identified patent and that said Letters Patent are hereby corrected as shown below:

Columns 3 and 4, in the Table, under the heading titled "At", line 2, "500" should read --100--;

Columns 3 and 4, in the Table, under the heading titled "At", line 4, "2" should read -- -2 --;

Columns 3 and 4, in the Table, under the heading titled "Rn", line 2, "100" should read --500--;

Columns 3 and 4, in the Table, under the heading titled "Rn", line 4, "2" should read -- -2 --;

Columns 3 and 4, in the Table, in the last footnote, "2" should read -- -2 --.

Signed and Sealed this eighteenth Day of May 1976

[SEAL]

Attest:

RUTH C. MASON
*Attesting Officer*

C. MARSHALL DANN
*Commissioner of Patents and Trademarks*